United States Patent
Kelley et al.

(10) Patent No.: US 7,510,067 B2
(45) Date of Patent: Mar. 31, 2009

(54) LOW PROFILE TURNTABLE ASSEMBLY

(75) Inventors: Reginald D. Kelley, Shelby Township, MI (US); John L. Vaphiadis, Beverly Hills, MI (US)

(73) Assignee: Easom Automation Systems, Inc., Madison Heights, MI (US)

( * ) Notice: Subject to any disclaimer, the term of this patent is extended or adjusted under 35 U.S.C. 154(b) by 0 days.

(21) Appl. No.: 11/181,288

(22) Filed: Jul. 14, 2005

(65) Prior Publication Data

US 2007/0012543 A1      Jan. 18, 2007

(51) Int. Cl.
*B65G 1/00* (2006.01)

(52) U.S. Cl. .............. 198/346.1; 198/346.2; 198/346.3; 198/748; 414/286; 414/280

(58) Field of Classification Search .............. 198/346.1, 198/339.1, 465.1, 465.3, 346.2, 346.3
See application file for complete search history.

(56) References Cited

U.S. PATENT DOCUMENTS

| 4,285,233 A | 8/1981 | Swis |
| 4,718,810 A * | 1/1988 | Hoehn et al. ................. 414/286 |
| 4,795,021 A * | 1/1989 | Moller ..................... 198/346.1 |
| 4,832,170 A * | 5/1989 | Takeuchi et al. ......... 198/346.1 |
| 5,401,220 A * | 3/1995 | Heller ........................ 475/180 |
| 6,435,397 B2 | 8/2002 | Angel |
| 2001/0054536 A1* | 12/2001 | Spatafora .................... 198/418 |
| 2003/0059284 A1* | 3/2003 | Inui ...................... 414/331.02 |
| 2004/0035314 A1 | 2/2004 | Muchalov |

* cited by examiner

*Primary Examiner*—Gene Crawford
*Assistant Examiner*—Kavel P Singh
(74) *Attorney, Agent, or Firm*—Jacox, Meckstroth & Jenkins

(57) ABSTRACT

A large rectangular rotary table includes a fabricated tubular metal frame having top plates for supporting fixtures and large motor vehicle parts. A center portion of the table frame is supported by an annular turret bearing mounted on a base plate spaced above a floor plate by adjustable leveling screws. A drive unit is also supported by the base plate within the bearing and the center portion of the table frame and includes a planocentric gear reducer driven by an electric servo motor projecting above the table. A laterally projecting torque arm is mounted on the output of the gear reducer and is connected to the table frame by a sliding drive pin assembly which prevents radial loads on the gear reducer when the table is indexed. A fluid actuated table locating pin alternately engages a locating seat on each end of the table after the table is indexed.

4 Claims, 2 Drawing Sheets

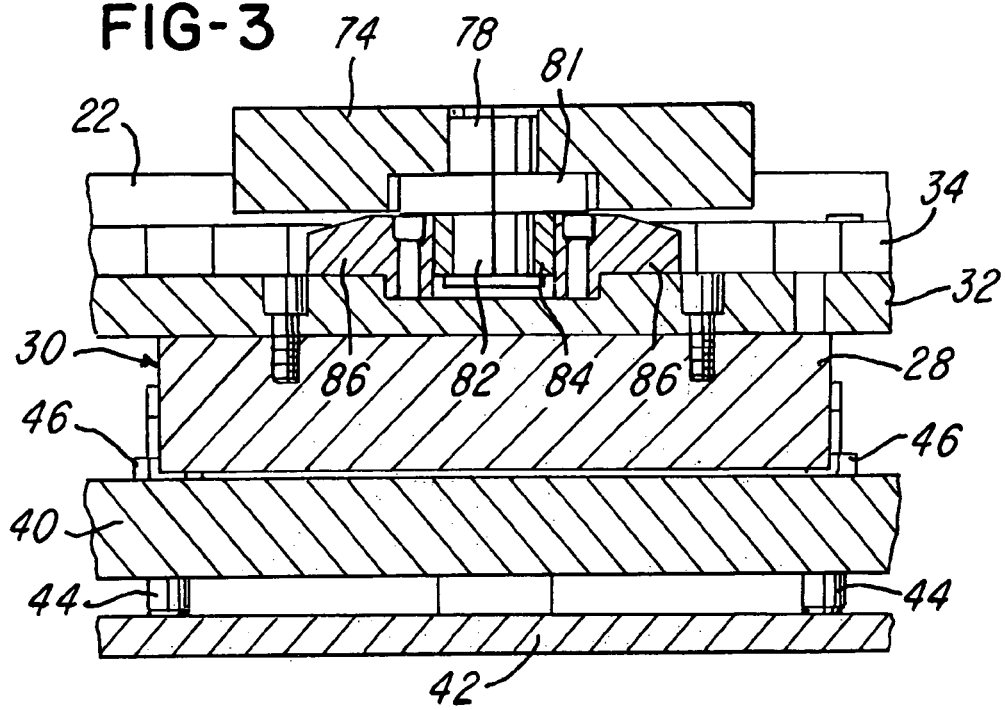
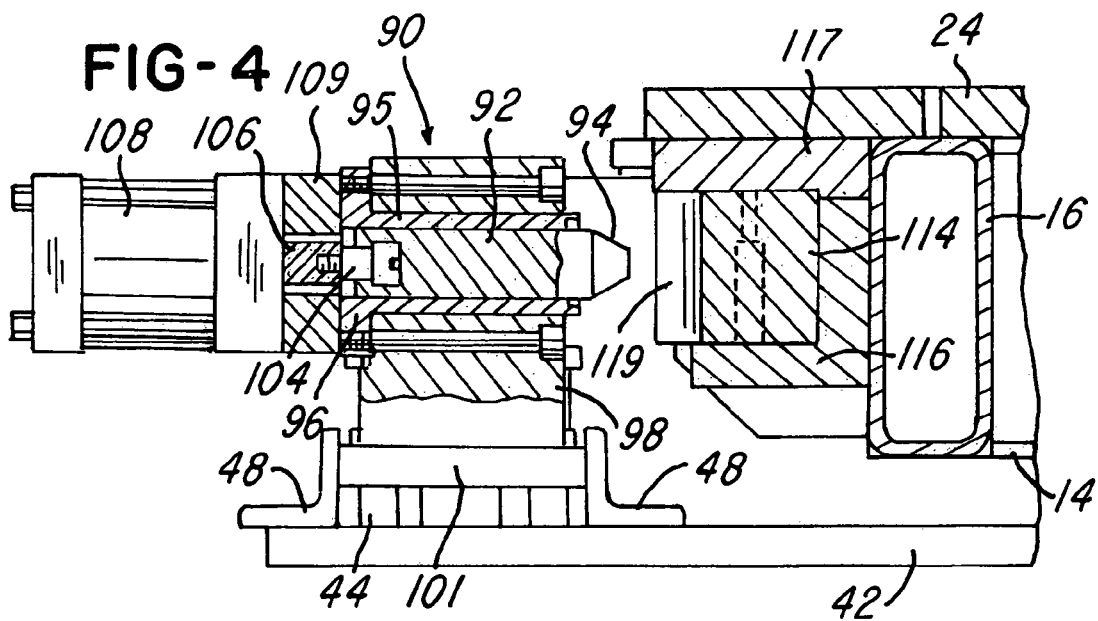
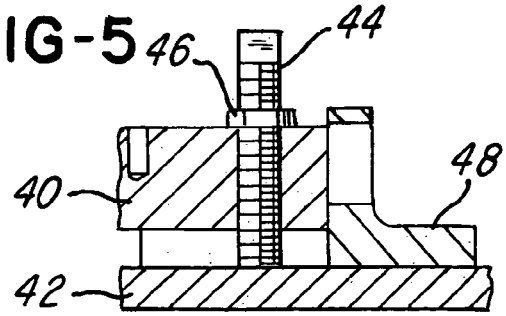

LOW PROFILE TURNTABLE ASSEMBLY

BACKGROUND OF THE INVENTION

The present invention relates to a large, heavy-duty turntable assembly of the type used for transferring or indexing heavy workpieces or parts such as motor vehicle parts. Such turntable assemblies are generally disclosed, for example, in U.S. Pat. Nos. 4,285,233, 4,795,021 and 6,435,397. In this type of turntable assembly which may be used to transfer motor vehicle frames or body parts to robotic welders, it is highly desirable for the assembly to have a low profile above the floor without requiring a pit within the floor to receive an indexing drive mechanism so that the assembly may be located anywhere in a manufacturing plant. A low profile turntable is also desirable in order to avoid using man stands or platforms for the operators to work and/or to avoid the need to elevate the heavy parts when loading the parts onto an elevated turntable and the need to lower the parts from the turntable.

A low profile turntable also provides for operator ergonomics and enables the turntable to be conveniently used and serviced. This is especially desirable when the parts being loaded, transferred and unloaded have substantial weight such as several thousand pounds, and the tools or fixtures which are mounted on the turntable for supporting the parts also have substantial weight, for example, five thousand to six thousand pounds. It is further desirable for a loaded turntable to rotate or index or oscillate quickly and precisely so that there is minimal down time of the equipment adjacent the turntable, such as robotic welders, which perform operations on the parts after they are indexed or transferred.

SUMMARY OF THE INVENTION

The present invention is directed to an improved turntable assembly which provides all of the desirable features mentioned above and which especially provides for transferring or indexing tooling or fixtures and parts having combined weights of many thousand pounds and which also has a very low profile to facilitate loading heavy parts onto the turntable and unloading parts from the turntable. The turntable assembly of the invention is also capable of quickly indexing or oscillating in a time period of only a few seconds and further provides for precise registration of the table after indexing.

In accordance with one embodiment of the invention, a turntable assembly includes a generally horizontal base plate for mounting on a floor, and a fabricated tubular metal frame having a plurality of spaced supports for mounting tooling or fixtures. The table frame is supported by an annular turret bearing mounted on the base plate, and a drive unit has an output supported by the base plate within the bearing and a center portion of the table frame. The drive unit rotates the table frame and includes a speed reducer and an electric servo motor which projects upwardly from the center portion of the table. The speed reducer is connected to a laterally projecting torque member or arm, and a vertical drive pin connects the torque arm to the table frame.

Other features and advantages of the invention will be apparent from the following description, the accompanying drawings and the appended claims.

BRIEF DESCRIPTION OF THE DRAWINGS

FIG. 3 is a fragmentary section taken generally on the line 3-3 of FIG. 2;

FIG. 4 is a fragmentary section taken generally on the line 4-4 of FIG. 1; and

FIG. 5 is a fragmentary section of a floor plate and the adjustable base or support plate shown in FIGS. 2-4.

DESCRIPTION OF ONE PREFERRED EMBODIMENT

Figure 1:
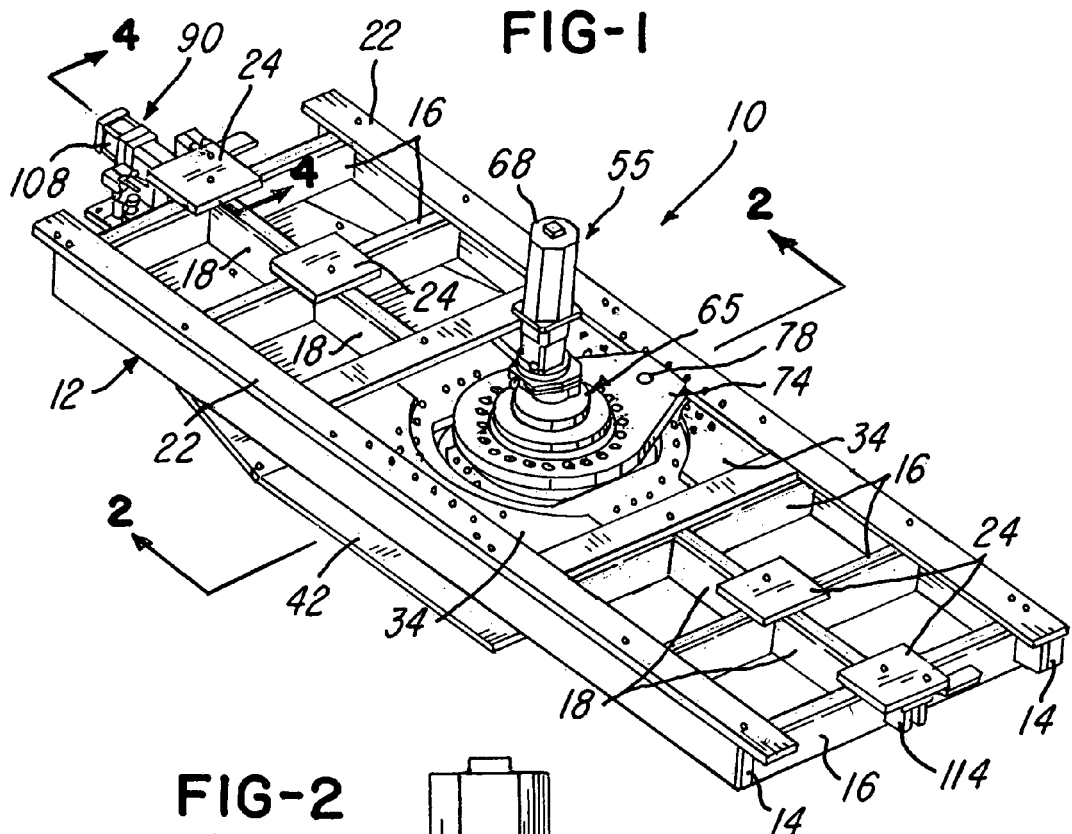
FIG. 1 is a perspective view of a low profile turntable assembly constructed in accordance with the invention.
Figure 2:
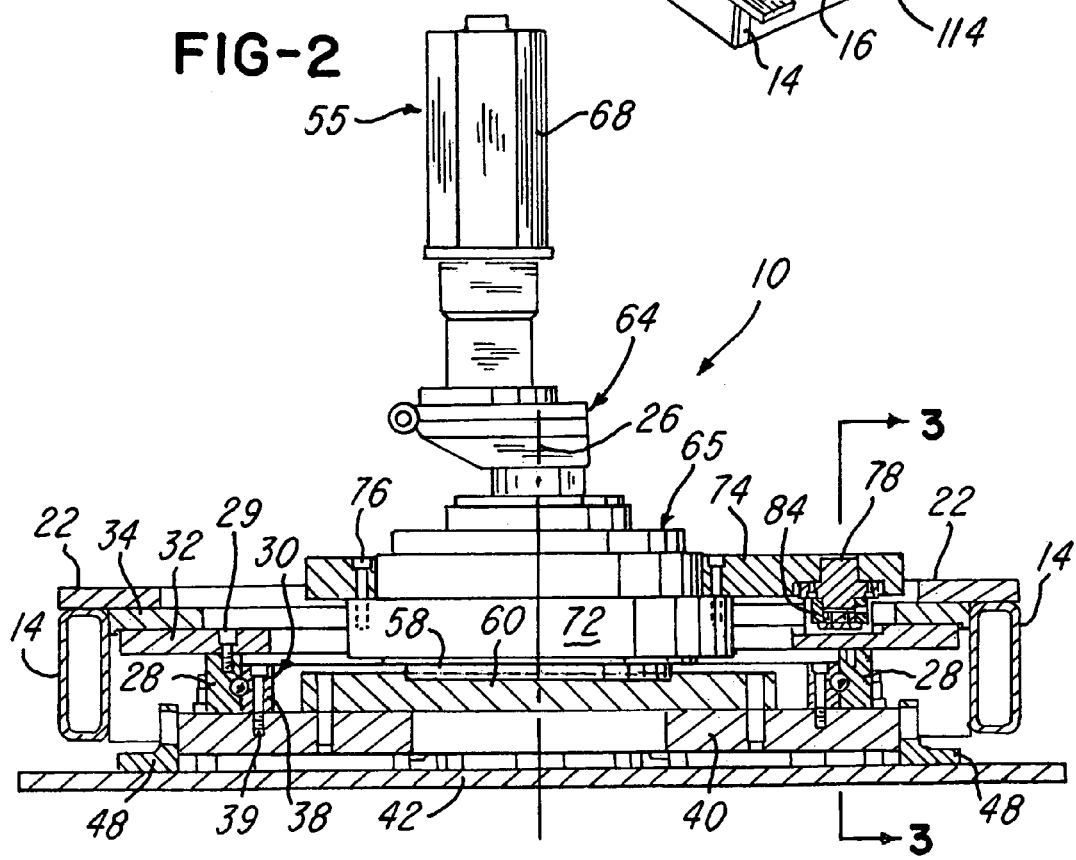
FIG. 2 is a section of the assembly taken generally on the line 2-2 of FIG. 1.

FIG. 1 illustrates a low profile turntable assembly 10 which includes an elongated rectangular fabricated steel table frame 12 having a pair of longitudinally extending members or rails 14 formed of steel tubing with a rectangular cross-section, as shown in FIG. 2. The parallel spaced rails 14 are rigidly connected by cross frame members 16 which are also formed of rectangular steel tubing and which are welded to the side rails 14. The cross frame members 16 are also rigidly connected by longitudinally extending frame members 18 which are formed from rectangular steel tubing and welded to the cross members 16. A pair of longitudinally extending steel top plates 22 are welded to the top of side rails 14, and a pair of longitudinally spaced fixture support members or plates 24 are welded to the top surfaces of the frame members 16 and 18 on each end portion of the table frame 12.

The table frame 12 is supported for rotation on a vertical center axis 26 (FIG. 2) by the annular outer race 28 of a large diameter turret bearing 30, for example, of the type manufactured and sold under the trademarks Kaydon and Rotek. The outer bearing race 28 is secured by screws 29 to an annular support plate 32 which is secured or welded to a set of opposing side plates 34 projecting under the top plates 22 and welded to the top plates. The turret bearing 30 has an annular inner race 38 which is secured by screws 39 to an annular base plate 40. The base plate 40 is supported by a floor plate 42 through a plurality of adjustable jack screws 44 (FIG. 5) which are threaded into the base plate 40 and are secured by lock nuts 46. After the floor plate 42 is located in a plant on the plant floor, the table 12 is leveled with the rotational axis 26 precisely vertical by adjusting the jack screws 44 to level the base plate 40. If it is desired to secure the table frame 12 in the level position, the base plate 40 is welded to weld blocks or angle brackets 48 (FIG. 5) which are, in turn, welded to the floor plate 42.

The table frame 12 is rotated or indexed on the axis 26 through 180° by a drive unit or assembly 55 which rotates with the table frame and has a downwardly projecting non-rotating output shaft secured to a circular plate 58 mounted within a recess in a circular bottom plate 60 secured by screws to the base plate 40. The drive unit 55 includes a speed reducer 64 of the type manufactured by SEW-Eurodrive, Inc. in Troy, Ohio and coupled to a planocentric robotic speed reducer 65 of the type manufactured by Nabtesco Motion Control, Inc. in Novi, Mich. The speed reducer 64 is driven by the output shaft of an electrical closed loop servo motor 68, such as a robotic servo motor produced by Fanuc as a 7th axis alpha 30/3000i. The motor power cable and encoder cable (not shown) project upwardly from the motor 68 and are adapted to twist when the table frame 12 and drive unit 55 oscillate through an angle of 180°.

The speed reducer 65 has a stepped cylindrical base 72 which rotates relative to the plates 58 and 60 and supports a torque member or arm 74 which is secured to the speed reducer base 72 by circumferentially spaced screws 76. The torque plate 74 carries a hardened and ground drive pin 78

(FIG. 3) which has an outwardly projecting flange 81 secured to the torque arm 74 by screws. The pin 78 has a downwardly projecting portion 82 which supports for rotation a square bronze drive shoe 84. The drive shoe 84 is captured between a pair of flame hardened steel drive plates 86 having ground parallel spaced faces engaging the drive shoe. The drive plates 86 are secured to the table plate 32 by a set of screws, and the drive shoe 84 is able to slide radially between the drive plates 86 to prevent radial loading on the torque arm 74 and the base 72 of the speed reducer 65 when the table 12 is indexed or rotated in response to actuation of the servo motor 68.

After the table frame 12 indexes 180°, the table frame is precisely located or registered by a locating or registry unit 90 (FIG. 4) which includes a horizontal cylindrical locating pin 92 having a tapered or frusto-conical outer end portion 94. The pin is supported for axial movement within a bearing sleeve 95 having an end flange 96 secured to a support member or housing 98. The housing 98 has a bottom flange 101 which is connected to the floor plate 42 by a set of adjustable jack screws 44 for precisely positioning the axis of the locating pin 92 at a predetermined elevation relative to the table frame 12. After adjustment, the base plate 101 may be rigidly secured to the floor plate 42 by welding a pair of angle blocks or brackets 48 to the base plate 101 and the floor plate 42. The locating pin 92 has an inner end portion secured by a screw 104 to a reciprocating piston 106 of a fluid or air cylinder 108 secured to the housing 98 by an annular mounting plate 109. As shown in FIGS. 1 & 4, a locating or registry block 114 is secured to each end of the table frame 12 by support blocks 116 and 117, and each block 114 is formed with a V-shaped wedge locating seat 119. After the table frame 12 is indexed 180°, the air cylinder 108 is actuated to extend the pin 92 until the end portion 94 wedges into the seat 119, thereby precisely locating the table frame 12 and the tooling and parts carried by the table frame.

From the drawings and the above description, it is apparent that a turntable assembly 10 constructed in accordance with the invention provides desirable features and advantages. For example, the turntable assembly is especially usable for transferring heavy motor vehicle parts or frames from a loading station to a welding and unloading station and for transferring the parts 180° in a short period of time such as six seconds. The table frame 12 is also constructed to support substantial loads such as tooling or fixtures mounted on the pads or plates 24 and having a weight, for example, of 8,000 pounds. The turntable assembly 10 also eliminates the requirement for a pit to accommodate the drive mechanism, with the top of the table frame 12 spaced only inches above the floor, for example 12 inches. This low profile of the table frame 12 greatly facilitates loading tooling or fixtures and parts onto the table frame and unloading the parts from the tooling.

As another feature, the planocentric speed reducer 65 eliminates backlash and provides smooth and accurate positioning of the table frame. Also all gear reduction is sealed within the housing of the reducer so that no gears are exposed and no lube system is required. In addition, all of the components of the drive unit 55 are removable from the top side of the table for convenient servicing. The drive of the table frame 12 from the torque arm 74 with the pin 78 and radial sliding shoe 84 also eliminates any side loading on the speed reducer 65 as the table frame is being rotated. The wedge locating or registering pin 92 also cooperates with the locating seat 119 to assure precision location of the table frame 12 after it has been indexed. The easily accessible jack screws 44 further provide for conveniently leveling the table 12 after which the base plate may be welded to the floor plate with the weld blocks or angle brackets 48.

While the form of turntable assembly herein described constitutes a preferred embodiment of the invention, it is to be understood that the invention is not limited to this precise form of assembly, and that changes may be made therein without departing from the scope and spirit of the invention as defined in the appended claims.

What is claimed is:

1. A low profile turntable assembly in combination with a horizontal supporting floor for transferring large parts having substantial weight between work stations, said assembly comprising
    a fabricated metal table frame positioned adjacent said floor and including horizontally extending and parallel spaced crossing frame members,
    an annular center support plate mounted on said frame members and defining a central opening for said table frame,
    said table including horizontally spaced support members positioned horizontally outwardly from said center support plate for supporting the parts,
    a horizontal stationary base plate positioned within said frame and secured to a floor plate mounted on said floor,
    an annular turret bearing mounted on said base plate within said table frame between said frame members and under said center support plate and supporting said table frame for rotation around said turret bearing adjacent said floor on a vertical axis extending through said central opening of said table frame,
    a drive unit mounted on said base plate and projecting upwardly through said central opening within said center support plate and substantially above said table frame,
    said drive unit including a speed reducer driven by a motor positioned above said speed reducer,
    said speed reducer having a rotary output positioned within said central opening and connected to a horizontal torque member projecting radially outwardly from said speed reducer adjacent said center support plate,
    a drive coupling spaced horizontally from said speed reducer and connecting said torque member to said center support plate to produce rotation of said table frame on said axis in response to actuation of said motor, and
    said drive coupling providing for radial outward and radial inward movement of said table frame relative to said base plate and said speed reducer when said table frame is rotated by said drive unit to avoid horizontal loading on said drive unit by said table frame during rotation of said table frame.

2. A turntable assembly as defined in claim 1 wherein said drive coupling includes a drive shoe mounted on a drive pin connected to said torque member, and
    horizontally spaced drive plates connected to said center support plate and having parallel spaced radially extending surfaces receiving said drive shoe therebetween to provide for said radial movement of said table frame relative to said base plate and said speed reducer.

3. A turntable assembly as defined in claim 1 wherein said speed reducer comprises a planocentric robotic gear reducer, and said motor comprises an electric servo motor projecting upwardly from said gear reducer in laterally offset relation to said vertical axis of said rotation of said table frame.

4. A turntable assembly as defined in claim 1 and including a plurality of adjustable jack screws threaded vertically into said base plate and engaging said floor plate to provide for precisely leveling base plate and said table frame, and a plurality of weld blocks welded to said base plate and to said floor plate after said base plate and said table frame are leveled.

* * * * *